United States Patent [19]

Fishman et al.

[11] Patent Number: 6,143,337
[45] Date of Patent: Nov. 7, 2000

[54] EXTRACTION OF PECTIN BY MICROWAVE HEATING UNDER PRESSURE

[75] Inventors: Marshall L. Fishman, Lansdale; Hoa K. Chau, Willow Grove, both of Pa.

[73] Assignee: The United States of America as represented by the Secretary of Agriculture, Washington, D.C.

[21] Appl. No.: 09/302,962

[22] Filed: Apr. 30, 1999

[51] Int. Cl.[7] .................... A23L 01/0524; A23L 01/025
[52] U.S. Cl. .......................... 426/241; 426/478; 426/577
[58] Field of Search ................................. 426/241, 577, 426/478

[56] References Cited

FOREIGN PATENT DOCUMENTS 01004602  6/1987  Japan .
401004602  1/1989  Japan .

OTHER PUBLICATIONS

Manabe, Masatoshi et al., "Extraction of Pectins by use of Microwave Radiation", *Chemical Abstracts*, vol. 110, (1989).

Masatoshi Manabe et al., "The Extraction of Pectin by Microwave Heating", *Nippon Shokuhin Kogyo Gakkaishi*, vol. 35, No. 7, 497–501 (1988).

M. Kratchanova et al., "Extration of Pectin from Fruit Materials Pretreated in an Electromagnetic Field of Super-High Frequency", *Elsevier Science Lit.* (1994), Great Britain.

M. Kratchanova et al., "Influence of Microwave Pretreatment of Fresh Orange Peels on Pectin Extraction", *Elsevier Science B.V.* (1996).

*Primary Examiner*—Nina Bhat
*Attorney, Agent, or Firm*—M. Howard Silverstein; John D. Fado; Janelle S. Graeter

[57] ABSTRACT

High-quality pectins may be extracted from pectin-containing plant materials with microwave energy under pressure. The pectins are characterized by increased molecular weight, size and intrinsic viscosity when compared to pectin extracted by conventional heating techniques.

16 Claims, 5 Drawing Sheets

EXTRACTION OF PECTIN BY MICROWAVE HEATING UNDER PRESSURE

BACKGROUND OF THE INVENTION

1. Field of the Invention.

High quality pectins are an important ingredient in many confectionary products. This invention relates to a method of extracting high quality pectin from citrus, apple and other pectin-containing plant materials by the application of high-energy microwaves under pressure.

2. Description of the Related Art.

A significant amount of research on pectins has been carried out due to its importance as a food product, a dietary fiber and a component of cell walls in higher plants, and to the growing awareness of a number of pharmacological activities. Conventional methods of pectin extraction from all the above pectin sources do not produce pectins of sufficient quality for such uses, however. As a result, millions of pounds of pectin extracted from raw materials such as orange peels are used as low-value animal feed. The high value of food quality pectins has prompted researchers to search for methods of pectin extraction which will increase the yield and the quality of the product. Currently available high-quality pectins are predominantly obtained from lime and lemon peels and are extracted by conventional methods.

By current methods, pectin is extracted from citrus peel in heated water (approximately 85° C.) at acid pH (about 1–3) for a period of time in excess of 30 min. Manabe et al. (1988. *Nippon Shokuhin Kogyo Gakkaishi* 35. pp. 497–501) reported the use of microwave energy in an open vessel to extract pectin from mandarin orange pulp. About 5% more pectin could be extracted in 15 min than could be extracted in 60 min by conventional methods of heating at 85° C. Kratchanova et al. (1994. *Carbohydrate Polymers*. vol. 25, pp. 141–144) reported that microwave pretreatment of crushed fruit materials increased pectin yield and resulted in a product having a higher degree of esterification and gel strength compared to conventional methods alone. In a subsequent study, Kratchanova et al. (1996. *Pectins and Pectinases*. Visser, J. and Voragen, A. G. J., eds. Elsevier Science, pp. 941–946) reported that increases in intensity (0.45–0.9 kW) and time (2–20 min) of microwave treatment had a favorable effect on pectin yield and quality.

Although these processes do not produce pectins which meet quality standards as high as the process described herein, the results indicated that microwave energy was potentially useful in an extraction process.

SUMMARY OF THE INVENTION

We have discovered that pectin extracted by applying microwave energy under pressure results in a product which is higher in quality than that produced by previously-described methods and which is acceptable for food-grade use. Furthermore, extractions are more rapid than those carried out by conventional methods.

In accordance with this discovery, it is an object of the invention to provide a method of extracting pectin from pectin-containing materials by applying microwave energy to a sample of plant material in a closed environment. Application of energy to the closed environment raises both the temperature and pressure sufficient for the extraction of pectin from the plant material to occur.

Other objects and advantages will be apparent from the following description.

DETAILED DESCRIPTION OF THE INVENTION

The novel process for the extraction of pectin from plant materials is carried out according to the following steps:

1) making a mixture of pectin-containing plant material in an acidic aqueous medium,
2) placing the mixture in a closed microwave-transparent container,
3) applying microwave energy to the mixture at a frequency and for a time sufficient for pectin extraction to occur,
4) cooling the mixture, and
5) separating pectin from the residue.

The separation step may include washing with an alcohol which precipitates any remaining pectin and dissolves alcohol-soluble materials.

Figure 1:
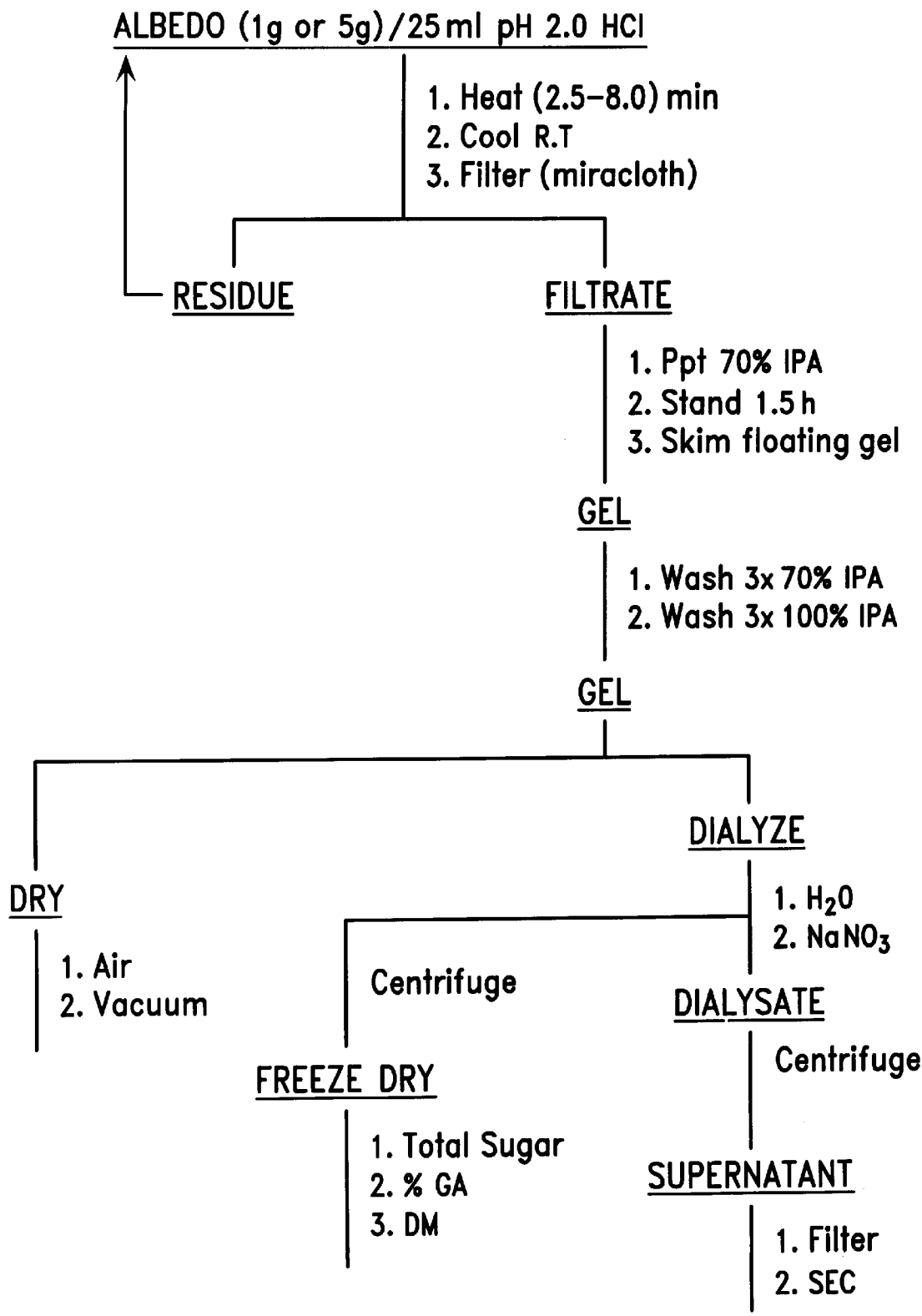
FIG. 1 shows a flow chart for pectin extraction, isolation and analysis.

A flow chart of the essential steps of the extraction process is shown in FIG. 1. The chart shows two end product alternatives: drying prior to storage and ultimate use and dialysis prior to analysis of physical properties.

Pectin-containing plant materials are well-known in the art and include fresh and processed materials as well as plant residues. The particular plant source utilized is not critical, however agricultural sources which are currently underutilized are envisioned. There is potentially a large volume of raw material from which pectin can be extracted since it is a major component of fruits and vegetables and is therefore plentiful in agricultural wastes. Examples of sources from which pectin may effectively be extracted are many kinds of fruits including stone fruits such as peaches, pome fruits such as apples, citrus fruits such as limes, lemons, oranges and grapefruit, and sunflower heads.

The material may be prepared for extraction by coarsely chopping, milling or grinding. Amounts in ratios ranging from about 1 g to about 5 g per about 25 ml acidic aqueous medium have been found effective for extraction purposes.

The acidic aqueous medium may have a pH ranging from about 1 to about 3, preferably about 2. Acidic aqueous media which are useful include, but are not limited to, hydrochloric acid, nitric acid and acetic acid.

The mixture is placed in a microwave transparent container so that microwave energy can pass through the walls of the container and heat the plant material. Since the container is closed, the temperature and pressure increase in response to the microwave energy applied. A temperature maximum of about 150° C. and a pressure maximum of about 50 psi are permitted. Optimal temperature ranges from about 80° C. to about 125° C. and optimal pressure from about 17 psi to about 30 psi. Microwave digestion vessels are known in the art and are commercially available (e.g. CEM Corporation, Matthews, N.C.).

The time required for optimum extraction may vary according to the material utilized and may be arrived at experimentally (see FIG. 2). For fresh frozen tissue, for example, the optimum time ranges from about 2.5 to about 3.0 min for the sample sizes described herein.

Microwave settings useful for the extraction process are standard in the industry (as described in *Introduction to Microwave Sample Preparation: Theory and Practice*. 1988. Kingston, H. M. and Jassie, L. B., eds. American Chemical Society Professional Reference Book, Washington, D.C., herein incorporated by reference). Other settings may be used, however, and can be determined by routine experimentation. Standard industry frequency is about 2450 MHz and energy is about 630 Watts, and it is not necessary to vary these settings according to the material used.

Following the microwave treatment, the mixture is allowed to cool sufficiently for ease of handling. Care should be taken in opening the digestion vessel, since the contents are under pressure, relative to the temperature. Although it is not critical, cooling to approximately room temperature is preferred.

Separation of pectin from the extraction residue may be effectively achieved by first filtering the acidic medium containing the pectin extract off the residue, then removing as much of the medium remaining in the residue as possible. Pectin may then be precipitated from the medium with alcohol (such as about 70% to about 100%, v/v). Useful alcohols include, but are not limited to, any alcohol which is compatible with food applications and which effectively precipitates pectins and dissolves alcohol-soluble materials. Preferred alcohols are isopropyl alcohol and ethanol. The pectin precipitate appears as a gel floating on the acidic medium. The gel may be skimmed off and washed with alcohol sufficient to precipitate all remaining pectin and remove as much alcohol-soluble material as possible. The washing steps may include first washing three times with aliquots of alcohol (about 70%, v/v), followed by washing three times with aliquots of a higher alcohol concentration, i.e. about 100%. Alcohols useful for washing are the same as those used for the precipitation step.

Pectin is a group of complex anionic polysaccharides whose backbone consists primarily of blocks of 1–4 linked homogalacturonan interrupted by single 1–2 linked rhamnose units (BeMiller, J. N. 1986. in Fishman, M. L. and Jen, J. J., eds. *Chemistry and Functions of Pectins*. ACS Symposium Series, pp. 2–12). A small percentage of the pectin backbone contains regions of rhamnogalacturonans with rhamnose side chains and xylogalacturonans in which xylose is the side chain (Renard et al. 1998. *Carbohydr. Res.* vol. 305, pp. 271–280). The homogalacturonan blocks are copolymers of galacturonic acid and its methyl ester. In many naturally-occurring pectins, 50% or more of the carboxyl groups are methyl esterified. Pectin also contains the neutral sugars galactose and arabinose. These often occur as side chains linked to the rhamnogalacturonan portion of the pectin backbone.

The solution properties of pectin have been studied frequently, often in an effort to obtain a better understanding of its functional properties (Rinaudo, M. 1995. in Visser, J. and Voragen, A. G. J., eds. *Pectins and Pectinases*. Elsevier, pp. 21–33), and the existence of pectin aggregates in solution has been reported (Sorochan et al. 1971. *Carbohydr. Res.* vol. 20, pp. 243–248; Jordan, R. C. and Brant, D. A. 1978. *Biopolymers*. vol. 17, pp. 2885–2895; Davis et al. 1980. *Int. J. Biol. Macromol.* vol. 2, pp. 330–332). Pectin aggregates form in solution under non-gelling conditions and could be considered precursors to gelation. As such, the nature of these aggregates could provide a basis for understanding whether or not a particular pectin would be a good gelling agent.

While pectins of acceptable quality have a number of industrial applications (i.e. films with numerous applications), the high-quality pectins obtainable by the novel method are of particular value. Optimum time and temperature for extraction from particular plant materials may be arrived at by experimentation using yield as well as the physical properties of molecular weight (MW), intrinsic viscosity (IV) and radius of gyration ($R_g$) as parameters. All values should be as high as possible while the ratio of $M_z/M_n$ should be as close to 1 as possible ($M_z$ represents Z-average MW; $M_n$ represents number average MW; the ratio is a measure of the polydispersity of the pectin aggregates).

Experiments were carried out to evaluate extraction parameters. Molecular weight, IV, $R_g$, anhydrogalacturonic acid content, neutral sugar content and degree of esterification of solubilized pectins were determined to measure the effects of microwave heating under pressure on pectin structure. While many pectin-containing plant materials are useful for the extraction process, orange albedo was selected for these tests because of its availability. Physical properties were determined by size exclusion chromatography having a multi angle laser light scattering (MALLS) detector for the measurement of MW and $R_g$, a differential pressure viscometer detector for the measurement of IV and a differential refractive index monitor for the measurement of concentration.

Figure 2A:
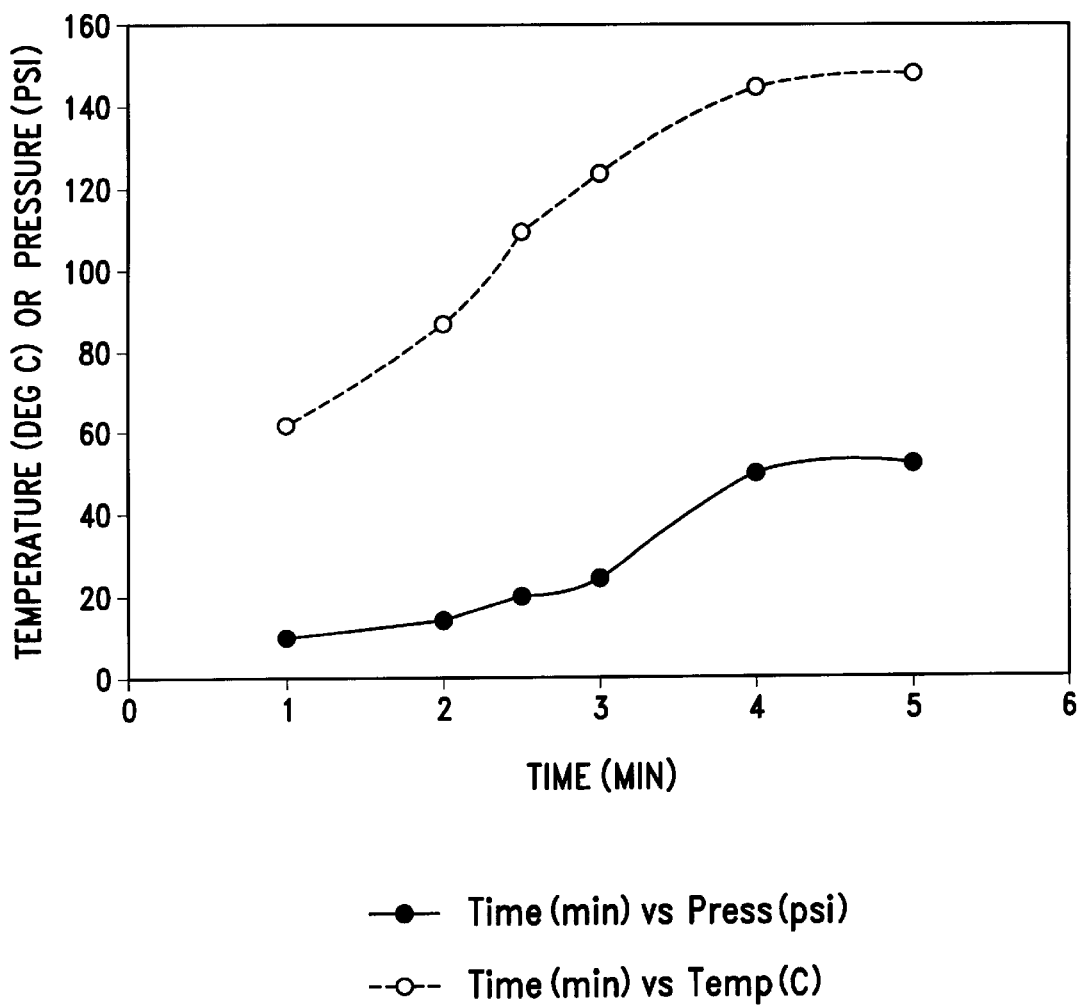
FIGS. 2a and 2b shows temperature and pressure as a function of heating time during pectin extraction. Solvent is HCl, pH 2. Panel A: Sample load of 1 g/25 ml solvent; Panel B: Sample load of 5 g/25 ml solvent.
Figure 2B:
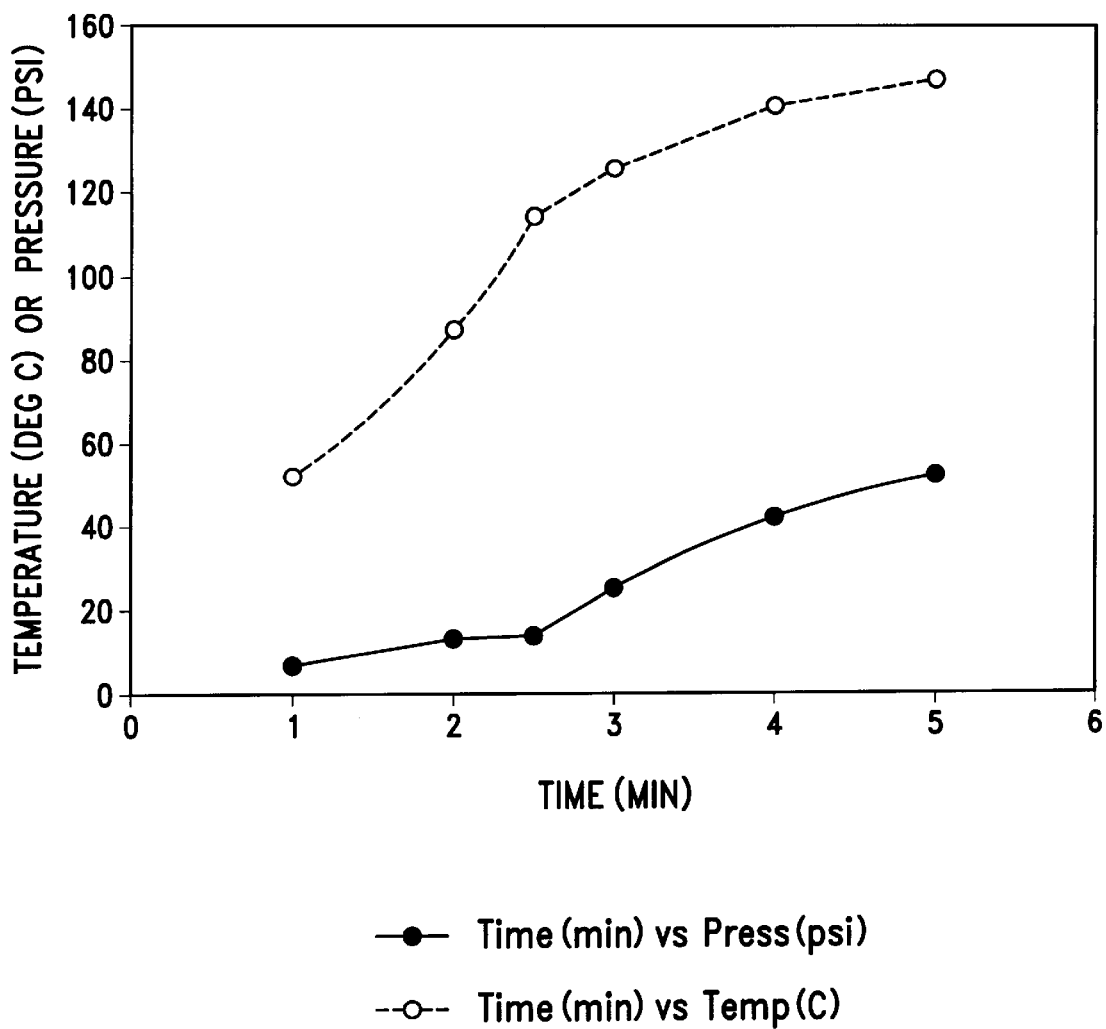

Temperature and pressure were measured over time of microwave heating for 1 g and 5 g samples, as described in the Example. Results are shown in FIG. 2A and 2B. The maximum recorded temperature was the same (147° C.) for both samples, however the temperature was reached in the 1-g sample faster than in the 5-g sample. The 1-g sample also reached the maximum pressure limit more quickly than the 5-g sample. Thus the smaller sample load reached its temperature plateau more rapidly than the larger sample load. Since change in pressure is proportional to change in temperature when both are allowed to change freely, the smaller sample load also reached its pressure plateau more rapidly than the larger sample.

Figure 3A:
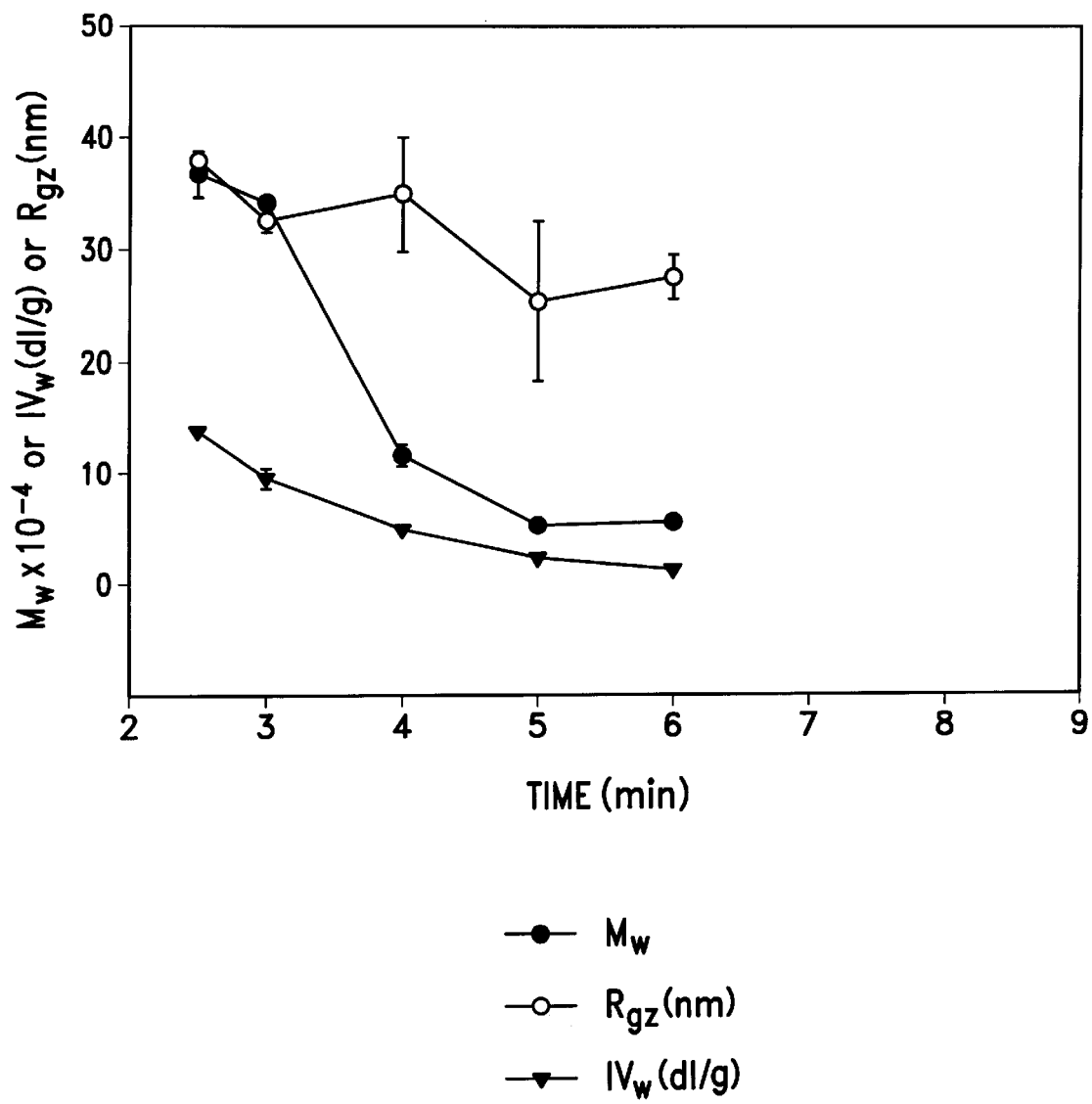
FIGS. 3a and 3b shows the effect of heating time on pectin properties. Panel A: sample load 1 g/25 ml; Panel B: Sample load 5 g/25 ml.
Figure 3B:
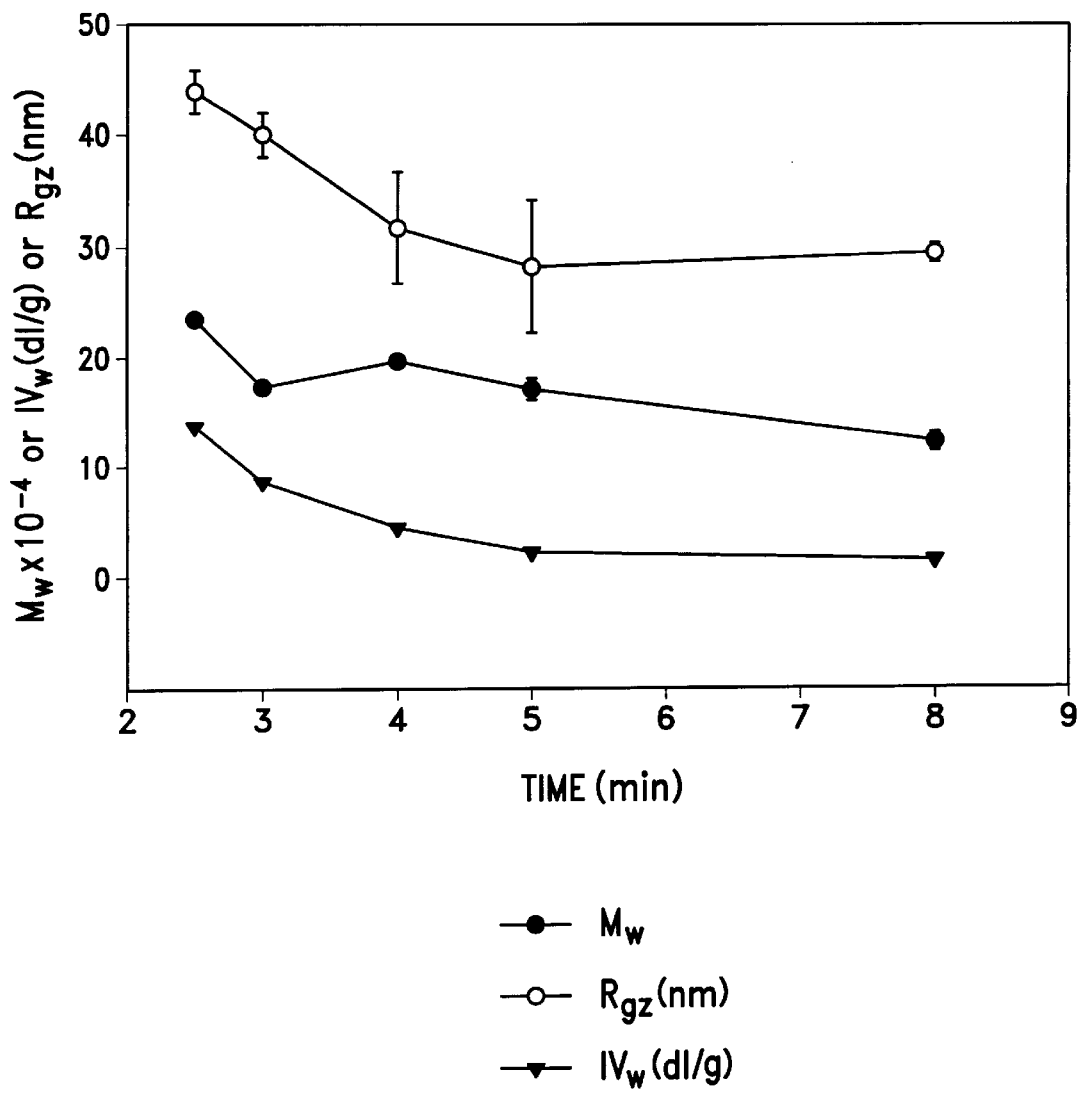

Results of tests assessing the effects of microwave heating time on MW, IV and $R_g$ are shown in FIG. 3 and Table 1. Samples of 1 g/25 ml and 5 g/25 ml were utilized for experimentation. Values for all three properties decreased with increased heating time. The highest values for these properties were obtained after 2.5 min of heating for both sample loads. For heating times less than 2.5 min, insufficient quantities of pectin were obtained for analysis. For heating times of 2.5 and 3 min, MW and IV values were higher than those for commercial citrus pectin (CCP) when the sample load was 1 g/25 ml. For the 5 g/25 ml sample load, however, IV was higher, but MW was lower.

At heating times of 4 min or longer, IV and MW values were lower than found for CCP.

Dialysis of pectin against water, then 0.1% EDTA, followed by 0.05 M $NaNO_3$ had no effect on IV or MW at a heating time of 2.5 min. This indicated that pectin aggregates were not due to $Ca^{2+}$ crosslinking.

TABLE 1

Molecular Properties of Selected Pectins.

| | 1 g/25 ml[1] | | | 5 g/25 ml[1] | | |
|---|---|---|---|---|---|---|
| Sample | MW × 10[5] | $R_g$ (nm) | IV (dL/g) | MW × 10[5] | $R_g$ (nm) | IV (dL/g) |
| 2.5[2] | 3.6(0.2)[3] | 38(1) | 10.8(0.1) | 2.4(0.1) | 44(2) | 13.8(0.2) |
| 2.5[2,4] | 3.4(0.1) | 40(2) | 10.3(0.1) | | | |
| 3.0[2] | 3.4(0.1) | 33(1) | 7.7(0.5) | 1.8(0.1) | 40(2) | 8.8(0.2) |
| CCP[5] | 2.8(0.1) | 38(1) | 5.5(0.2) | | | |
| 4.0[2] | 1.2(0.1) | 35(5) | 4.8(0.1) | 2.0(0.1) | 37(3) | 4.5(0.3) |

[1]Albedo/solvent extraction ratio;
[2]Time of microwave heating;
[3]Standard deviation of triplicate analysis;
[4]Dialyzed against 0.1% EDTA prior to dialysis against 0.05 M $NaNO_3$;
[5]Commercial citrus pectin control.

Percent sugar and degrees of esterification (DE) were measured for various samples (Dubois et al. 1956. *Anal. Chem.* vol. 28, pp. 350–356; Blumenkrantz, N. and Asboe-Hansen, G. 1973. *Anal. Biochem.* vol. 54, pp. 484–489;

Mangos, T. J. and Haas, M. J. 1996. *J. Agr. Food Chem.* vol. 44, pp. 2977–2981), and results are shown in Table 2. The percent anhydrogalacturonic acid in pectin (AGAP) ranged from about 84% to about 96% (the absorbance of AGAP having been corrected for the absorbance of neutral sugars). There was no discernable trend with heating time, although the AGAP for samples of 1 g/25 ml may have been slightly higher than those of 5 g/25 ml. DE values ranged from 69 to 96% with no discernable trend with heating time but slightly lower values at the higher sample load of 5 g/25 ml. AGAP and DE were appreciably higher for the microwave-extracted pectin from fresh frozen orange albedo than for pectin extracted by conventional heating methods, such as described by Kratchanova et al. (1994, supra). In conventionally heated pectin, AGAP and DE were about 71%.

Yields were investigated by measuring percent recovery of pectin from dried albedo and total pectin in the albedo (Table 3). Loss of moisture on drying was 70.8%. Total pectin was obtained by assaying AGAP and neutral sugars calorimetrically and combining percentages. The percentage of pectin recovery was obtained by weighing and drying the material precipitated by alcohol from the acid extract. When the albedo:solvent ratio was 1:25 (w/v), 11.3% of the dried albedo or 20.2% of the pectin in the albedo was recovered after heating for 3 min. At an albedo:solvent ratio of 5:25 (w/v), 11.0% of the dried albedo or 19.6% of the pectin in the albedo was recovered after heating for 6 min. Based on these recovery data and the molecular properties (FIG. 3), the 1:25 albedo:solvent ratio and heating time of 3 min are the preferred extraction conditions. The yield of pectin on a fresh weight basis at 3 min microwave heating was 3.30% compared to a reported amount of 3.36% for fresh orange peels extracted according to conventional methods (Kratchanova et al., 1994, supra).

TABLE 2

Percentage of Sugars in Orange Albedo Pectin.

| Extraction Time (min) | 1 g/25 ml[1] | | | 5 g/25 ml[1] | | |
|---|---|---|---|---|---|---|
| | NS[2] | AGAP[3] | DE[4] | NS[2] | AGAP[3] | DE[4] |
| 2.5 | 4.2(0.2) | 96 | 91(1) | 16(1) | 84 | 91(1) |
| 3.0 | 7.2(0.1) | 93 | 93(2) | 19(2) | 91 | 69(1) |
| 4.0 | 11(1) | 88 | 73(2) | 7.4(0.5) | 92 | 80(2) |

[1]Albedo: solvent extraction ratio;
[2]Neutral sugars;
[3]Anhydrogalacturonic acid in pectin;
[4]Degree of esterification.

TABLE 3

Percentage Recovery of Pectin in Orange Albedo.

| Extraction Time (min) | 1 g/25 ml[1] | | 5 g/25 ml[1] | |
|---|---|---|---|---|
| | Albedo[2] | Pectin[3] | Albedo[2] | Pectin[3] |
| 2.5 | 4.3 | 7.7 | 2.9 | 5.2 |
| 3.0 | 11.3 | 20.2 | 3.3 | 5.9 |
| 4.0 | 8.3 | 14.8 | 8.0 | 14.3 |
| 5.0 | 11.3 | 20.2 | 11.0 | 19.6 |
| 6.0 | 11.3 | 20.2 | — | — |
| 8.0 | — | — | 8.6 | 15.3 |

[1]Albedo: solvent extraction ratio;
[2]Percentage of dried albedo;
[3]Percentage of pectin in dried albedo (55.9% pectin).

The effects on pectin properties and yields of repeated extractions of samples were assessed. At an albedo:solvent ratio of 1:25, the same residue was extracted 3 times for a duration of 2.5 min per extraction. Results are shown in Table 4. MW and $R_g$ remained relatively constant for the three extractions whereas IV decreased with increasing number of extractions. However, even at the third extraction, IV was appreciably higher than values obtained at heating times of 4 min or longer (see FIG. 3A and Table 2). Results indicate that pectin extracted during the first eatraction and still in solution is degraded somewhat during the second and third rounds of extraction. Pectin recoveries are shown in Table 5. From the data presented in Tables 4 and 5, it can be seen that short multiple microwave extractions yield pectins with better properties and in higher amounts than conventional heat extraction.

TABLE 4

Molecular Properties of Sequentially Extracted Pectin[1].

| Extraction Number[2] | MW × 10$^5$ | $R_g$ (nm) | IV (dL/g) |
|---|---|---|---|
| 1 | 2.6(0.2)[3] | 37(4) | 9.9(0.1) |
| 2 | 2.4(0.1) | 37(1) | 8.3(0.2) |
| 3 | 2.7(0.2) | 34(4) | 6.7(0.4) |

[1]Albedo:solvent ratio, 1:25 (w/v);
[2]Extraction sequence;
[3]Standard deviation of triplicate analysis.

TABLE 5

Percentage Recovery of Pectin from sequential Extraction (2.5 min)[1].

| Number | Albedo[2] | Pectin[3] |
|---|---|---|
| 1 | 7.2 | 12.9 |
| 2 | 2.8 | 5.0 |
| 3 | 5.3 | 9.5 |
| Total | 15.3 | 27.4 |

[1]Albedo:solvent ratio, 1:25 (w/v);
[3]Percentage of dried albedo;
[3]Percentage of pectin in dried albedo (55.9% pectin).

It has previously been demonstrated by electron microscopy that dilute solutions of pectin in salt may exist as rods, segmented rods and kinked rods (Fishman et al. 1992. *Arch. Biochem. Biophys.* vol. 294, pp. 253–260; Fishman et al. 1993. *Carbohydr. Res.* vol. 248, pp. 303–316). Moreover, pectin becomes more rod-like in character with decreasing MW. These rods are components of microgels with an internal network structure which has been observed when pectin is dissolved under conditions of low ionic strength. The microgels were of the order of 1000 nm in diameter whereas the dissociated components ranged from about 20 to 300 nm in contour length. Microwave extraction solubilizes pectin as a mixture of partially dissociated network structure (loose microgels) and network components fully dissociated from the network in the form of rods, segmented rods and kinked rods. It appears that pectin extracted at a heating time of 2.5 min is almost entirely in the form of microgels. As heating time increases, however, the proportion of fully dissociated components increases at the expense of microgels. The general trend with heating is that high MW, relatively compact networks are being converted to less compact dissociated components. Thus, overheating causes the pectin aggregate to fall apart.

The extraction of pectin from orange albedo by microwave heating under pressure has thus been shown to produce pectin with increased molecular weight, size and intrinsic viscosity when compared to pectin extracted by conventional heating techniques. Based on experimental evidence and measurements utilizing size exclusion chromatography with on-line molar mass and viscosity detection, these increases in molecular properties are attributable to the solubilization of large relatively compact aggregated network structures when pectin is rapidly released from its plant matrix. Prolonged heating tends to dissociate these aggregates into smaller, more asymmetric components of the network.

The following example is intended only to further illustrate the invention and not to limit the scope of the invention as defined by the claims. All cited references are herein incorporated by reference.

EXAMPLE

Extraction of Pectin from Orange Albedo.

Flavedo was stripped from the skin of early Valencia oranges with a potato peeler, followed by removal of the albedo with a paring knife. After chopping into small pieces, the albedo may be stored at −20° C. in sealed polyethylene bags until extraction, or it may go directly into the extraction process, as shown in the flow chart of FIG. 1. A 1- or 5-g sample of chopped albedo was combined with 25 ml HCl, pH 2.0 and placed in a microwave transparent vessel (a microwave sample preparation system, CEM Corporation, supra). Samples were irradiated for a predetermined amount of time with 630 watts of microwave power at a frequency of 2450 MHz. The oven contained a circular, 360° rotating carousel which had the capacity to hold up to twelve vessels. One vessel was equipped with temperature and pressure sensing devices which measured and controlled the temperature and pressure within the cell. Experiments were performed with pH adjusted with 0.2 N HCl to 1.0, 1.5 and 2.0. Cells were loaded with either 1 g or 5 g chopped albedo dispersed in 25 ml acid solution. In one set of experiments, the same residue was extracted three times to determine the effect of repeated extractions.

After microwave heating was applied, the extraction mixture was allowed to cool to room temperature. Pectin-containing acid solution was filtered off the albedo residue. Approximately 120–130 ml 70% isopropyl alcohol (IPA) was added to the same volume of filtrate and left for about 90 min. Floating gel was skimmed from the top of the filtrate and washed three times with 200–300-ml aliquots 70% IPA, followed by washing 3 times with 200–300-ml aliquots 100% IPA.

The washed product is either stored as a wet alcohol gel or freeze or air dried before storage.

We claim:

1. A method for extracting pectin from pectin-containing plant material, said method comprising
    a) making a mixture of pectin-containing plant material and an acidic aqueous medium,
    b) placing the mixture in a closed microwave-transparent container,
    c) applying microwave energy to the mixture at a frequency and for a time sufficient for temperature and pressure inside the container to increase, and for pectin extraction to occur,
    d) cooling the mixture, and
    e) separating extracted pectin from residue.

2. The method of claim 1, wherein said plant material is present in the mixture at a weight:volume ratio ranging from about 1 g to about 5 g per about 25 ml acidic aqueous medium.

3. The method of claim 1, wherein said acidic aqueous medium has a pH of about 1 to about 3.

4. The method of claim 3, wherein said acidic aqueous medium has a pH of about 2.

5. The method of claim 1, wherein said microwave energy is about 630 Watts and said frequency is about 2450 MHz.

6. The method of claim 1, wherein the temperature inside the container reaches a maximum of about 150° C., and the pressure within the container reaches a maximum of about 50 psi.

7. The method of claim 1, wherein the temperature inside the container is about 80° C. to about 125° C.

8. The method of claim 1, wherein the pressure with the container is about 17 psi to about 30 psi.

9. The method of claim 1, wherein said mixture is cooled to approximately room temperature.

10. The method of claim 1, wherein said extracted pectin is separated from the mixture by filtering the pectin-containing acidic medium from the residue, adding alcohol to the acidic medium to form a precipitate and removing the pectin precipitate from the acidic medium.

11. The method of claim 10, wherein said precipitate is washed with alcohol following removal from the acidic medium.

12. The method of claims 10 or 11, wherein said alcohol is isopropyl alcohol or ethanol.

13. The method of claim 10, wherein said alcohol is about 70% to about 100% (v/v) alcohol.

14. The method of claim 11, wherein said precipitate is washed three times with about 70% alcohol (v/v), followed by three times with about 100% alcohol (v/v).

15. The method of claim 1, wherein the residue of step e) is carried through steps a)–e) up to two additional times.

16. A method for extracting pectin from pectin-containing plant materials, said method comprising
    a) making a mixture of pectin-containing plant material and an acidic aqueous medium of about pH 1 to about pH 3,
    b) placing the mixture in a closed microwave-transparent container,
    c) applying microwave energy of about 630 Watts to the mixture at a frequency of about 2450 MHz for a time sufficient for the temperature inside the container to reach a maximum of about 150° C. and the pressure within the container to reach a maximum of about 50 psi,
    d) cooling the mixture, and
    e) separating extracted pectin from residue.

* * * * *